(12) United States Patent
Ji et al.

(10) Patent No.: US 11,449,918 B2
(45) Date of Patent: Sep. 20, 2022

(54) MAKEUP SCHEME RECOMMENDATION METHOD AND DEVICE, CLOUD DEVICE, AND ELECTRONIC DEVICE

(71) Applicant: BOE TECHNOLOGY GROUP CO., LTD., Beijing (CN)

(72) Inventors: Shihao Ji, Beijing (CN); Xin Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 425 days.

(21) Appl. No.: 16/499,148

(22) PCT Filed: Mar. 11, 2019

(86) PCT No.: PCT/CN2019/077631
§ 371 (c)(1),
(2) Date: Sep. 27, 2019

(87) PCT Pub. No.: WO2019/223398
PCT Pub. Date: Nov. 28, 2019

(65) Prior Publication Data
US 2020/0226657 A1    Jul. 16, 2020

(30) Foreign Application Priority Data
May 22, 2018   (CN) .......................... 201810494703.2

(51) Int. Cl.
*G06Q 30/06*   (2012.01)
*G06Q 10/04*   (2012.01)
(Continued)

(52) U.S. Cl.
CPC ....... *G06Q 30/0631* (2013.01); *A45D 44/005* (2013.01); *G06F 16/24558* (2019.01);
(Continued)

(58) Field of Classification Search
None
See application file for complete search history.

(56) References Cited

U.S. PATENT DOCUMENTS

| 10,592,932 | B2 * | 3/2020 | Gu ..................... G06Q 30/0271 |
| 2010/0099383 | A1 * | 4/2010 | Yamagishi ............ H04M 1/673 455/411 |
| 2015/0121464 | A1 * | 4/2015 | Hughes, Jr. ............. H04L 63/08 726/4 |

(Continued)

FOREIGN PATENT DOCUMENTS

| CN | 101032394 A | 9/2007 |
| CN | 202026376 U | 11/2011 |

(Continued)

OTHER PUBLICATIONS

Anon., "MyBeautyBazaar Launches Premium Skin Care Brands Under One Roof," PR.com (Press Releases), Feb. 11, 2016. (Year: 2016).*

(Continued)

*Primary Examiner* — Nicholas D Rosen
(74) *Attorney, Agent, or Firm* — Muncy, Geissler, Olds & Lowe, P.C

(57) ABSTRACT

The makeup scheme recommendation method provided by embodiments of the present disclosure includes: acquiring makeup parameters of a user, the makeup parameters including at least one of an environment parameter, a body parameter, and a makeup time parameter; searching for a target makeup scheme matching the makeup parameters from a makeup scheme pool; optimizing the target makeup scheme in accordance with cosmetic information about the user, and generating a recommended makeup scheme, the cosmetic information being used to indicate cosmetics owned by the user; and providing the recommended makeup scheme to the user.

16 Claims, 7 Drawing Sheets

(51) Int. Cl.
*G06Q 10/08* (2012.01)
*A45D 44/00* (2006.01)
*G06F 16/2455* (2019.01)
*G06F 16/2457* (2019.01)

(52) U.S. Cl.
CPC ....... *G06F 16/24578* (2019.01); *G06Q 10/04* (2013.01); *G06Q 10/087* (2013.01)

(56) References Cited

U.S. PATENT DOCUMENTS

| | | | | |
|---|---|---|---|---|
| 2015/0250294 | A1* | 9/2015 | Miller | A45D 44/005 434/100 |
| 2015/0356661 | A1* | 12/2015 | Rousay | G06T 7/90 705/26.7 |
| 2018/0060919 | A1* | 3/2018 | Gu | H04L 67/02 |

FOREIGN PATENT DOCUMENTS

| | | | | |
|---|---|---|---|---|
| CN | 105138648 | A | 12/2015 | |
| CN | 106407855 | A | 2/2017 | |
| CN | 106446207 | A | 2/2017 | |
| CN | 106530014 | A | 3/2017 | |
| CN | 106886907 | A | 6/2017 | |
| CN | 107198391 | A | 9/2017 | |
| WO | WO-2012176958 | A1 * | 12/2012 | ......... G06Q 30/0241 |

OTHER PUBLICATIONS

Office Action of CN Application No. 201810494703.2 and translation, dated Apr. 22, 2020, 27 pages.

* cited by examiner

US 11,449,918 B2

MAKEUP SCHEME RECOMMENDATION METHOD AND DEVICE, CLOUD DEVICE, AND ELECTRONIC DEVICE

CROSS-REFERENCE TO RELATED APPLICATION

The present application is the U.S. national phase of PCT Application No. PCT/CN2019/077631 filed on Mar. 11, 2019, which claims a priority of the Chinese patent application 201810494703.2 filed on May 22, 2018, which are incorporated herein by reference in their entirety.

TECHNICAL FIELD

The present disclosure relates to information processing technology, in particular to a makeup scheme recommendation method, a makeup scheme recommendation device, a cloud device and an electronic device.

BACKGROUND

Usually, people become more beautiful through makeup. However, there are many makeup tricks, and a makeup procedure is relatively tedious and time-consuming. Therefore how to make up has become a big challenge for some people. Many people search for a makeup scheme on Internet and do the makeup in accordance with the recommended makeup scheme.

SUMMARY

In one aspect, the present disclosure provides in some embodiments a makeup scheme recommendation method, including: acquiring makeup parameters of a user, the makeup parameters including at least one of an environment parameter, a body parameter, and a makeup time parameter; searching for a target makeup scheme matching the makeup parameters from a makeup scheme pool; optimizing the target makeup scheme in accordance with cosmetic information about the user, and generating a recommended makeup scheme, the cosmetic information being used to indicate cosmetics owned by the user; and providing the recommended makeup scheme to the user.

In some possible embodiments of the present disclosure, the acquiring the makeup parameters of the user includes at least one of: acquiring position information from a client device, and searching for the environment parameter corresponding to the position information; and acquiring at least one of the pre-stored body parameter and the pre-stored makeup time parameter of the user.

In some possible embodiments of the present disclosure, the providing the recommended makeup scheme to the user includes providing the recommended makeup scheme to the client device.

In some possible embodiments of the present disclosure, each makeup scheme in the makeup scheme pool is provided with a parameter group, and the searching for the target makeup scheme matching the makeup parameters from the makeup scheme pool includes ranking matching scores between the parameter groups and the makeup parameters in a descending order, and searching for N target makeup schemes corresponding to N top matching scores from the makeup scheme pool, N being an integer greater than or equal to 1.

In some possible embodiments of the present disclosure, when N is an integer greater than 1, the optimizing the target makeup schemes in accordance with the cosmetic information about the user and generating the recommended makeup scheme includes selecting a target makeup scheme that best matches the cosmetics owned by the user from the N target makeup schemes, optimizing the selected target makeup scheme in accordance with the cosmetic information about the user, and generating the recommended makeup scheme.

In some possible embodiments of the present disclosure, the optimizing the target makeup schemes in accordance with the cosmetic information about the user and generating the recommended makeup scheme includes adding information about a cosmetic j in a step i of the target makeup scheme, and generating the recommended makeup scheme. The target makeup scheme includes M steps, M is an integer greater than 1, and step i is one of the M steps. The cosmetic j is one of the cosmetics owned by the user and used in the step i, and the information about the cosmetic j includes at least one of a name and usage amount information of the cosmetic j.

In some possible embodiments of the present disclosure, the makeup scheme recommendation method further includes, prior to optimizing the target makeup scheme in accordance with the cosmetic information about the user and generating the recommended makeup scheme, receiving the cosmetic information from the client device. The cosmetic information includes at least one of a cosmetic type, a cosmetic name, a cosmetic purchasing date, a cosmetic price, a cosmetic manufacturer, a cosmetic production date, a cosmetic expiration date, and a cosmetic volume.

In some possible embodiments of the present disclosure, the makeup scheme recommendation method further includes, when the cosmetic information includes the cosmetic expiration date and the cosmetics owned by the user include a soon-to-expire cosmetic, transmitting a prompt message indicating that the cosmetic is about to expire to the client device.

In another aspect, the present disclosure provides in some embodiments a makeup scheme recommendation method, including: transmitting position information to a cloud, so as to enable the cloud to acquire makeup parameters of a user, search for a target makeup scheme matching the makeup parameters from a makeup scheme pool, optimize the target makeup scheme in accordance with cosmetic information about the user, and generate a recommended makeup scheme, the makeup parameters including at least one of an environment parameter corresponding to the position information, a body parameter, and a makeup time parameter, the cosmetic information being used to indicate cosmetics owned by the user; and receiving the recommended makeup scheme from the cloud, and outputting the recommended makeup scheme.

In some possible embodiments of the present disclosure, the makeup scheme recommendation method further includes, prior to receiving the recommended makeup scheme from the cloud, transmitting the cosmetic information to the cloud. The cosmetic information includes at least one of a cosmetic type, a cosmetic name, a cosmetic purchasing date, a cosmetic price, a cosmetic manufacturer, a cosmetic production date, a cosmetic expiration date, and a cosmetic volume.

In some possible embodiments of the present disclosure, the makeup scheme recommendation method further includes, when the cosmetic information includes the cosmetic expiration date and the cosmetics owned by the user include a soon-to-expire cosmetic, receiving from the cloud a prompt message indicating that the cosmetic is about to expire, and outputting the prompt message.

In yet another aspect, the present disclosure provides in some embodiments a makeup scheme recommendation device, including: an acquisition module configured to acquire makeup parameters of a user, the makeup parameters including at least one of an environment parameter, a body parameter, and a makeup time parameter; a searching module configured to search for a target makeup scheme matching the makeup parameters from a makeup scheme pool; an optimization module configured to optimize the target makeup scheme in accordance with cosmetic information about the user, and generate a recommended makeup scheme, the cosmetic information being used to indicate cosmetics owned by the user; and a recommendation module configured to provide the recommended makeup scheme to the user.

In some possible embodiments of the present disclosure, the acquisition module includes: a first acquisition unit configured to acquire position information from a client device, and search for the environment parameter corresponding to the position information; and a second acquisition unit configured to acquire at least one of the pre-stored body parameter and the pre-stored makeup time parameter of the user.

In some possible embodiments of the present disclosure, the recommendation module is further configured to provide the recommended makeup scheme to the client device.

In some possible embodiments of the present disclosure, each makeup scheme in the makeup scheme pool is provided with a parameter group, and the searching module is further configured to rank matching scores between the parameter groups and the makeup parameters in a descending order, and search for N target makeup schemes corresponding to N top matching scores from the makeup scheme pool, N being an integer greater than or equal to 1.

In some possible embodiments of the present disclosure, when N is an integer greater than 1, the optimization module is further configured to select a target makeup scheme that best matches the cosmetics owned by the user from the N target makeup schemes, optimize the selected target makeup scheme in accordance with the cosmetic information about the user, and generate the recommended makeup scheme.

In some possible embodiments of the present disclosure, the optimization module is further configured to add information about a cosmetic j in a step i of the target makeup scheme, and generate the recommended makeup scheme. The target makeup scheme includes M steps, M is an integer greater than 1, and step i is one of the M steps. The cosmetic j is one of the cosmetics owned by the user and used in the step i, and the information about the cosmetic j includes at least one of a name and usage amount information of the cosmetic j.

In some possible embodiments of the present disclosure, the makeup scheme recommendation device further includes a reception module configured to receive the cosmetic information from the client device. The cosmetic information includes at least one of a cosmetic type, a cosmetic name, a cosmetic purchasing date, a cosmetic price, a cosmetic manufacturer, a cosmetic production date, a cosmetic expiration date, and a cosmetic volume.

In some possible embodiments of the present disclosure, the makeup scheme recommendation device further includes a prompt module configured to, when the cosmetic information includes the cosmetic expiration date and the cosmetics owned by the user include a soon-to-expire cosmetic, transmit a prompt message indicating that the cosmetic is about to expire to the client device.

In still yet another aspect, the present disclosure provides in some embodiments a makeup scheme recommendation device, including: a first transmission module configured to transmit position information to a cloud, so as to enable the cloud to acquire makeup parameters of a user, search for a target makeup scheme matching the makeup parameters from a makeup scheme pool, optimize the target makeup scheme in accordance with cosmetic information about the user, and generate a recommended makeup scheme, the makeup parameters including at least one of an environment parameter corresponding to the position information, a body parameter, and a makeup time parameter, the cosmetic information being used to indicate cosmetics owned by the user; and an output module configured to receive the recommended makeup scheme from the cloud, and output the recommended makeup scheme.

In some possible embodiments of the present disclosure, the makeup scheme recommendation device further includes a second transmission module configured to transmit the cosmetic information to the cloud. The cosmetic information includes at least one of a cosmetic type, a cosmetic name, a cosmetic purchasing date, a cosmetic price, a cosmetic manufacturer, a cosmetic production date, a cosmetic expiration date, and a cosmetic volume.

In some possible embodiments of the present disclosure, the makeup scheme recommendation device further includes a prompt module configured to, when the cosmetic information includes the cosmetic expiration date and the cosmetics owned by the user include a soon-to-expire cosmetic, receive from the cloud a prompt message indicating that the cosmetic is about to expire, and output the prompt message.

In still yet another aspect, the present disclosure provides in some embodiments a cloud device, including a memory, a processor, and a computer program stored in the memory and executed by the processor. The processor is configured to execute the computer program so as to implement the above-mentioned makeup scheme recommendation method.

In still yet another aspect, the present disclosure provides in some embodiments an electronic device, including a memory, a processor, and a computer program stored in the memory and executed by the processor. The processor is configured to execute the computer program so as to implement the above-mentioned makeup scheme recommendation method.

In still yet another aspect, the present disclosure provides in some embodiments a computer-readable storage medium storing therein a computer program. The computer program is executed by a processor so as to implement any one of the above-mentioned makeup scheme recommendation methods.

DETAILED DESCRIPTION

In order to make the objects, the technical solutions and the advantages of the present disclosure more apparent, the present disclosure will be described hereinafter in a clear and complete manner in conjunction with the drawings and embodiments.

In the related art, each makeup scheme recommended on a network merely includes basic makeup steps, and a corresponding cosmetic is used in each makeup step. Usually, when a user does not have cosmetics to be used in one or more makeup steps of the makeup scheme, the makeup steps will be omitted. Hence, it is probably unable for the user to achieve a desired makeup effect in accordance with the recommended makeup scheme.

Figure 1:
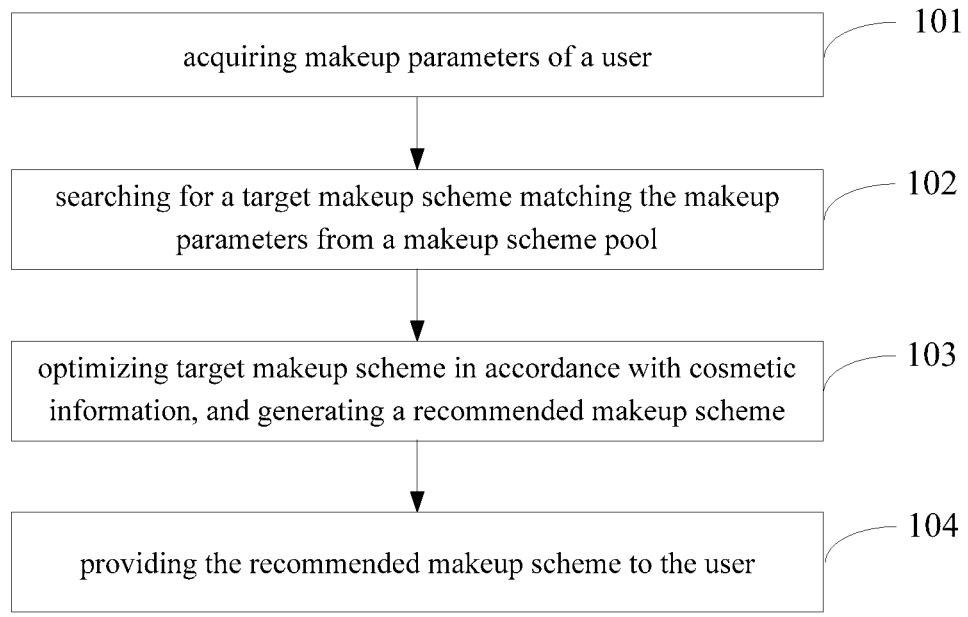
FIG. 1 is a flow chart of a makeup scheme recommendation method according to some embodiments of the present disclosure.

The present disclosure provides in some embodiments a makeup scheme recommendation method which, as shown in FIG. 1, includes Step 101 of acquiring makeup parameters of a user, the makeup parameters including at least one of an environment parameter, a body parameter, and a makeup time parameter; Step 102 of searching for a target makeup scheme matching the makeup parameters from a makeup scheme pool; Step 103 of optimizing the target makeup scheme in accordance with cosmetic information about the user, and generating a recommended makeup scheme, the cosmetic information being used to indicate cosmetics owned by the user; and Step 104 of providing the recommended makeup scheme to the user.

In some embodiments of the present disclosure, the makeup parameters of the user may be inputted through a client device.

In some embodiments of the present disclosure, the makeup parameters of the user may be inputted by the user. For example, the body parameter may be inputted by the user during the registration. For another example, each user (or customer) may be provided with an account in the cloud, and the body parameter, also called as registration information, may be stored in associated with the account.

In some embodiments of the present disclosure, the body parameter may include age, gender or skin type information.

In some embodiments of the present disclosure, the cosmetic information may be stored in association with the account, and the cosmetic information may be used to indicate the cosmetics owned by the user (e.g., the cosmetics that have been purchased by the user).

In some embodiments of the present disclosure, the environment parameter may be environment information about a corresponding region acquired through collecting position information about the user. For example, the environment information about the corresponding region may be acquired by the cloud in accordance with the position information reported by the client device.

In some embodiments of the present disclosure, the environment parameter may include at least one of temperature, humidity, illumination, wind force and air quality.

In some embodiments of the present disclosure, the makeup time parameter may be inputted by the user in advance. For example, the user may set a user preference at the client device in accordance with the user's living habit, e.g., set a daytime makeup time as about 30 minutes and set a nighttime makeup time as 50 minutes.

When the makeup parameters include at least one of the environment parameter, the body parameter and the makeup time parameter, the target makeup scheme matching the makeup parameters may be searched for using one or more of the environment parameter, the body parameter and the makeup time parameter.

In some embodiments of the present disclosure, the target makeup scheme matching the makeup parameters may be searched for using the environment parameter, the body parameter and the makeup time parameter. When the target makeup scheme is searched for using a plurality of parameters, it is able to acquire the target makeup scheme with a better matching level.

In some embodiments of the present disclosure, the makeup scheme pool may be acquired in advance, or acquired through accessing a remote device via a network.

In some embodiments of the present disclosure, the makeup scheme pool may include a plurality of makeup schemes corresponding to different makeup parameters. For example, the makeup scheme pool may include makeup schemes for men and makeup schemes for women.

In some embodiments of the present disclosure, the makeup schemes for men may include makeup schemes for different environments and makeup schemes for different ages.

In some embodiments of the present disclosure, the makeup schemes for women may include makeup schemes for different environments and makeup schemes for different ages.

In some embodiments of the present disclosure, the searching for the target makeup scheme matching the makeup parameters from the makeup scheme pool may include searching for the target makeup scheme adapted to the makeup parameters from the makeup scheme pool. For example, a makeup scheme A is adapted to men at a high temperature, and a makeup scheme B is adapted to women at a low temperature. When the makeup parameters include a gender as male and a high temperature, the makeup scheme A may be selected.

In some embodiments of the present disclosure, in Step 102, one or more target makeup schemes may be searched for, and each target makeup scheme may also be called as a theoretical makeup scheme. The target makeup scheme may probably not be a finally-recommended scheme, and it may be optimized subsequently as follow-up in combination with the user's cosmetics.

In some embodiments of the present disclosure, for each cosmetic owned by the user, the cosmetic information may include a cosmetic type, a cosmetic name, a purchasing date, a price, a manufacturer, a production date, and an expiration date.

In some embodiments of the present disclosure, the cosmetic information may be acquired through the client device, or directly inputted by the user. For example, the user may use the client device to acquire the cosmetic information about the cosmetic that has already been purchased through scanning a bar code or a QR code, or the user may manually input the cosmetic information. The client device may upload the cosmetic information about the cosmetic that has already been purchased to the cloud in the case of being connected to the cloud.

In some embodiments of the present disclosure, the cosmetic information may be stored in associated with the user's account, and updated in real time. For example, the cosmetic information about the user may be updated in accordance with the cosmetics purchased or used by the user.

In some embodiments of the present disclosure, the optimizing the target makeup scheme in accordance with the cosmetic information about the user and generating the recommended makeup scheme may include adding usage information about the cosmetics owned by the user into the searched target makeup scheme, or adjusting steps in the target makeup scheme in accordance with the cosmetics owned by the user. For example, when the target makeup scheme includes an eyebrow-drawing step but the cosmetics owned by the user do not include an eyebrow pencil, the eyebrow-drawing step may be cancelled, so as to optimize the target makeup scheme.

In some embodiments of the present disclosure, the providing the recommended makeup scheme to the user may include providing the recommended makeup scheme to the client device, or directly displaying the recommended makeup scheme, so as to recommend the recommended makeup scheme to the user.

In some embodiments of the present disclosure, the makeup scheme recommendation method may be applied to a cloud device.

In some embodiments of the present disclosure, the makeup scheme recommendation method may also be applied to an electronic device, e.g., a mobile phone, a flat-panel computer or a computer.

In some embodiments of the present disclosure, the makeup scheme may be recommended to the user in advance. For example, the makeup scheme may be recommended to the user in the night before, so as to enable the user to manage time properly.

According to the makeup scheme recommendation method in the embodiments of the present disclosure, the recommended makeup scheme may be searched for in accordance with the makeup parameters of the user, so as to acquire the target makeup scheme matching the makeup parameters of the user. Then, the acquired target makeup scheme may be optimized in accordance with the cosmetics owned by the user, so as to enable the recommended makeup scheme to be adapted to user, thereby to achieve a desired makeup effect in accordance with the recommended makeup scheme.

In the embodiments of the present disclosure, the makeup parameters of the user may be acquired, and the makeup parameters may include at least one of the environment parameter, the body parameter and the makeup time parameter. Next, the target makeup scheme matching the makeup parameters may be searched for from the makeup scheme pool. Next, the target makeup scheme may be optimized in accordance with the cosmetic information about the user so as to generate the recommended makeup scheme. The cosmetic information is used to indicate the cosmetics owned by the user. Then, the recommended makeup scheme may be provided to the user. The recommended makeup scheme may be selected in accordance with the makeup parameters of the user and optimized in accordance with the cosmetic information about the user. As a result, it is able to provide the recommended makeup scheme suitable for the user, thereby to improve the user satisfaction.

Figure 2:
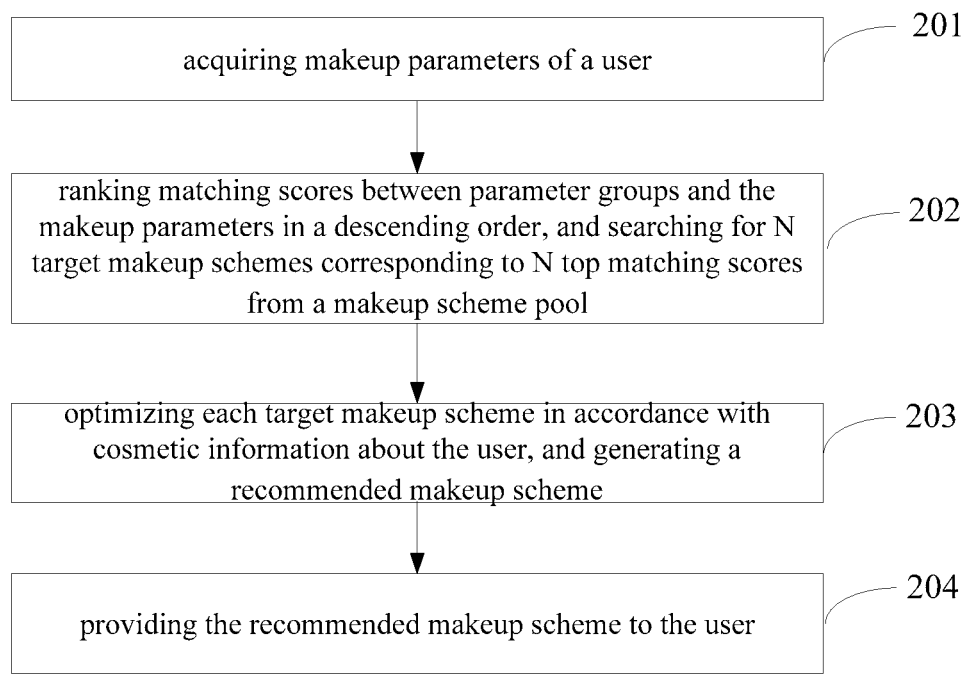
FIG. 2 is another flow chart of the makeup scheme recommendation method according to some embodiments of the present disclosure.

The present disclosure further provides in some embodiments a makeup scheme recommendation method which, as shown in FIG. 2, includes: Step 201 of acquiring makeup parameters of a user, the makeup parameters including at least one of an environment parameter, a body parameter, and a makeup time parameter; Step 202 of ranking matching scores between parameter groups and the makeup parameters in a descending order, and searching for N target makeup schemes corresponding to N top matching scores from a makeup scheme pool, each makeup scheme in the makeup scheme pool being provided with a parameter group, N being an integer greater than or equal to 1; Step 203 of optimizing each target makeup scheme in accordance with cosmetic information about the user, and generating a recommended makeup scheme, the cosmetic information being used to indicate cosmetics owned by the user; and Step 204 of providing the recommended makeup scheme to the user.

In some embodiments of the present disclosure, each makeup scheme in the makeup scheme pool may be provided with a parameter group.

For example, the parameter group for the makeup scheme may be shown in Table 1.

TABLE 1

| Parameter name | Parameter value |
| --- | --- |
| Gender | Female |
| Age | 28 |
| Applicable skin type | Dry skin |
| Weather type | Sunny day |
| Temperature | 20° C. |
| Humidity | 60% |
| Ultraviolet index | 5 |
| Wind force | Level 2 |
| Air quality | Good |
| Makeup time | 20 minutes |

In some embodiments of the present disclosure, the parameter groups for different makeup schemes may include different parameters. For example, some makeup schemes may include the parameter group in Table 1, and some other makeup schemes may include some parameters in the parameter group in Table 1, e.g., gender, age, applicable skin type, weather type, humidity and makeup time.

Each makeup scheme may be provided with the parameter group, and the makeup parameters of the user may be acquired in Step 201, so it is able to calculate the matching scores between the makeup schemes and the makeup parameters of the user, and then select the N target makeup schemes with the top N matching scores.

In some embodiments of the present disclosure, during the calculation of the matching scores between the makeup parameters and the parameter groups for the makeup schemes, each parameter in the makeup parameters may match a corresponding parameter in the parameter group, so as to acquire a score of each parameter. Then, the score of each parameter may be multiplied by a corresponding weight value, so as to acquire the matching scores between the makeup parameters and the parameter groups.

For example, each makeup scheme may be provided with a parameter group including 10 parameters as shown in Table 1. A weight value of each of gender, age and makeup time may be set as 25%. When the user is a man and the makeup scheme is for male, a score of gender may be 25 points, with a total score of 100 points. When the age of the user is the same as the age parameter in the makeup scheme, a score of age may be 25 points, with the subtraction of 2 points from 25 points when the age of the user differs by one year from the age parameter in the makeup scheme. When an expected makeup time is the same as the makeup time in the makeup scheme, a score of makeup time may be 25 points, with the subtraction of 2 points from 25 points when the expected makeup time differs by one minute from the makeup time in the makeup scheme. When a value of any other parameter is the same as that of the corresponding parameter in the makeup scheme, the parameter may have a predetermined score. When the value of any other parameter is different from that of the corresponding parameter in the makeup scheme, the parameter may have a score acquired by subtracting a certain value from the predetermined score. In this way, it is able to acquire the matching scores between the makeup parameters and each makeup scheme.

In some embodiments of the present disclosure, in order to reduce the calculation burden, the matching scores between the makeup parameters of the user and the parameter group for each makeup scheme. For example, one or more parameters may be selected from the makeup parameters, e.g., gender, age and makeup time, and then the makeup schemes matching the three parameters may be searched for from the makeup scheme pool. For example, when the gender is female, the age is 30 and the makeup time is 30 minutes, M makeup schemes for which the parameter group includes the parameters of female, age of 28 to 32 and makeup time of 25 to 35 minutes may be selected. Then, the corresponding score may be calculated in accordance with the other parameters in the parameter group, so as to select the N target makeup schemes from the M makeup schemes.

In Step 202, the one or more target makeup schemes that best match the makeup parameters of the user may be selected, so the recommended makeup scheme provided subsequently may be adapted to the user in a better manner.

In some embodiments of the present disclosure, when N is an integer greater than 1, the optimizing the target makeup schemes in accordance with the cosmetic information about the user and generating the recommended makeup scheme may include selecting a target makeup scheme that best matches the cosmetics owned by the user from the N target makeup schemes, optimizing the selected target makeup scheme in accordance with the cosmetic information about the user, and generating the recommended makeup scheme.

In some embodiments of the present disclosure, the target makeup scheme that best matches the cosmetics owned by the user may include a makeup scheme selected from the N target makeup schemes and including most cosmetics in the cosmetics owned by the user.

For example, when there are three target makeup schemes (i.e., a target makeup scheme #1 including a cosmetic #1, a cosmetic #2, a cosmetic #3 and a cosmetic #4, a target makeup scheme #2 including the cosmetic #1, the cosmetic #3, the cosmetic #4 and a cosmetic #5, and a target makeup scheme #3 including the cosmetic #1, the cosmetic #2, the cosmetic #4 and the cosmetic #5) and the cosmetics owned by the user include the cosmetic #1, the cosmetic #2, the cosmetic #3 and the cosmetic #4, the target makeup scheme #1 may be selected.

In some embodiments of the present disclosure, the target makeup scheme that best matches the cosmetics owned by the user may include a makeup scheme including cosmetics newly purchased by the user.

When the user has newly purchased a cosmetic, usually the cosmetic is to be used soon, and the above-mentioned makeup scheme includes the cosmetics owned by the user. The makeup scheme including the cosmetics owned by the user may be recommended to the user in time, so as to improve the user's satisfaction.

In some embodiments of the present disclosure, Step 101 may include Step 202.

In some embodiments of the present disclosure, the target makeup schemes may not be selected in accordance with the matching scores between the parameter groups and the makeup parameters. Instead, the target makeup scheme with a biggest score may be selected from a plurality of makeup schemes matching some parameters in the makeup parameters (e.g., gender, age and makeup time). For example, each makeup scheme may be scored in accordance with feedback information from the user, and then a makeup scheme with a biggest score may be recommended to the user. After the makeup scheme has been recommended by a system, the user may determine whether to accept the recommended makeup scheme, or score the recommended makeup scheme after accepting the recommended makeup scheme.

In some embodiments of the present disclosure, the acquiring the makeup parameters of the user may include at least one of: acquiring position information from a client device, and searching for the environment parameter corresponding to the position information; and acquiring at least one of the pre-stored body parameter and the pre-stored makeup time parameter of the user.

In some embodiments of the present disclosure, the providing the recommended makeup scheme to the user may include providing the recommended makeup scheme to the client device.

In the embodiments of the present disclosure, the position information about the user may be acquired from the client device, so it is able to determine a position of the user in accordance with the position information, thereby to acquire environment information. For example, a cloud device may receive the position information reported by the client device, and acquire the environment information.

In some embodiments of the present disclosure, at least one of the body parameter and the makeup time parameter of the user may be inputted by the user in advance. For example, the body parameter and the makeup time parameter may be inputted by the user during the registration. In some embodiments of the present disclosure, the body parameter and the makeup time parameter may be updated in real time or modified by the user.

In some embodiments of the present disclosure, the recommended makeup scheme may be provided to the client device of the user. When the recommended makeup scheme is provided to the client device of the user, it is able for the user to acquire the recommended makeup scheme conveniently, e.g., through a mobile phone or a computer.

In some embodiments of the present disclosure, upon the acquisition of the recommended makeup scheme, the client device may present makeup steps included in the recommended makeup scheme in the form of text, video or image in a GIF format. Each makeup step may include a specific operating method, cosmetics to be used, and a usage amount of each cosmetic, so as to improve a makeup effect using the recommended makeup scheme.

In some embodiments of the present disclosure, the cloud device may directly transmit the recommended makeup scheme in the form of text, video or image in a GIF format to the client device.

In some embodiments of the present disclosure, the optimizing the target makeup schemes in accordance with the cosmetic information about the user and generating the recommended makeup scheme may include adding information about a cosmetic j in a step i of the target makeup scheme, and generating the recommended makeup scheme. The target makeup scheme may include M steps, M is an integer greater than 1, and step i may be one of the M steps. The cosmetic j may be one of the cosmetics owned by the user and used in the step i, and the information about the cosmetic j may include at least one of a name and usage amount information of the cosmetic j.

Step i may be any step in the target makeup scheme. In the embodiments of the present disclosure, the corresponding cosmetic information (e.g., the name and the usage amount of the cosmetic) may be added into each step in the target makeup scheme, so as to enable the recommended makeup scheme to be adapted to the user in a better manner, thereby to improve the user's satisfaction.

In some embodiments of the present disclosure, the generated recommended makeup scheme may be shown in Table 2.

cosmetic name, a cosmetic purchasing date, a cosmetic price, a cosmetic manufacturer, a cosmetic production date, a cosmetic expiration date, and a cosmetic volume.

During the implementation, the cosmetic information may be received from the client device, and it may include at least one of the cosmetic type, the cosmetic name, the cosmetic purchasing date, the cosmetic price, the cosmetic manufacturer, the cosmetic production date, the cosmetic expiration date, and the cosmetic volume.

In some embodiments of the present disclosure, the cloud device may recommend an appropriate makeup scheme to the user in accordance with the cosmetic information.

In some embodiments of the present disclosure, the cloud device may manage the cosmetics owned by the user in accordance with the cosmetic information.

Figure 3:
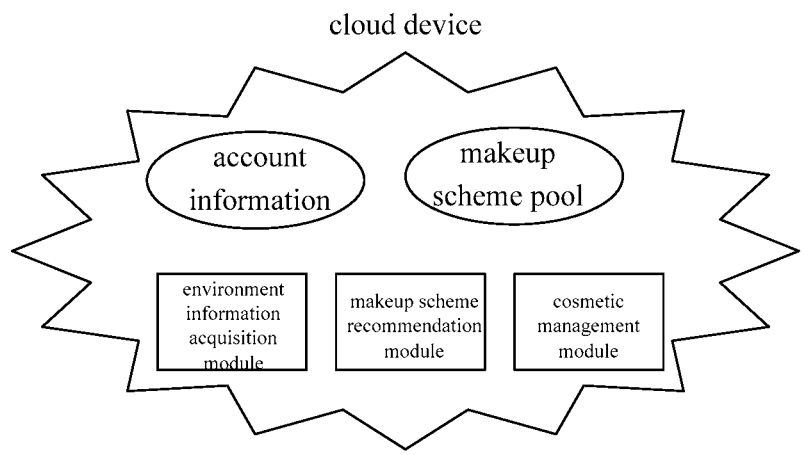
FIG. 3 is a schematic view showing internal modules of a cloud device according to some embodiments of the present disclosure.

For example, as shown in FIG. 3, the cloud device may include account information, the makeup scheme pool, an environment information acquisition module, a makeup scheme recommendation module and a cosmetic management module. The account information may include the body parameter of the user, the cosmetic information and makeup time information, and the makeup scheme pool may include a plurality of makeup schemes. The environment information acquisition module is configured to acquire the environment information. The makeup scheme recommendation module is configured to select the makeup scheme from the makeup scheme pool in accordance with the environment information and the account information. The

TABLE 2

| Step Number | Step Name | Measures | Cosmetics | Usage Amount | Time |
|---|---|---|---|---|---|
| 1 | Washing face | Washing the face with warm water and the facial cleanser, and drying the face | Facial cleanser A | 5 g | 6 minutes |
| 2 | Applying moisturizer | Evenly applying the moisturizer to the face | Moisturizer B | 2 g | 3 minutes |
| 3 | Applying foundation | Evenly applying powder to the face | Pressed powder C (No. 1) | At an appropriate amount | 5 minutes |
| 4 | Drawing eyebrow | Drawing from a brow ridge to a brow tail, and then from a brow head to the brow ridge | Eyebrow pencil D | At an appropriate amount | 10 minutes |
| 5 | Drawing eye line | Closing the eyes, and drawing the eye line with an eye liner along an eyelid | Eye liner E | At an appropriate amount | 10 minutes |
| 6 | Applying blusher | Applying the blusher to the skin under the cheekbone with a brush | Blusher F | At an appropriate amount | 8 minutes |
| 7 | Applying lip paints | Applying lip paints to the lips through a lipstick | Lipstick G | At an appropriate amount | 8 minutes |

The recommended makeup scheme in Table 2 may be adapted to the user in a better manner, and it includes a plurality of makeup details in the entire makeup procedure.

In some embodiments of the present disclosure, the makeup scheme recommendation method may further include, prior to optimizing the target makeup scheme in accordance with the cosmetic information about the user and generating the recommended makeup scheme, receiving the cosmetic information from the client device. The cosmetic information may include at least one of a cosmetic type, a cosmetic management module is configured to prompt the user of information about the expiration of the cosmetic, acquire information about the price of the cosmetic via a network, and add (and/or delete) cosmetics.

For example, the makeup scheme recommendation method may further include, when the cosmetic information includes the cosmetic expiration date and the cosmetics owned by the user include a soon-to-expire cosmetic, transmitting a prompt message indicating that the cosmetic is about to expire to the client device.

Because the cosmetic information has been stored, the prompt message may be transmitted to the user before the expiration of the cosmetic that has been purchased, so it is able to prevent the user from using the expired cosmetic, and prompt the user to use up the cosmetic before the expiration of the cosmetic.

In some embodiments of the present disclosure, the makeup scheme recommendation method may further include prompting the user to purchase a new cosmetic, so as to prevent the lack of some cosmetics in one or more makeup steps.

In some embodiments of the present disclosure, when the user is purchasing a new cosmetic, the cloud device may inquire whether the cosmetics that have been purchased include the cosmetic of a same type, so as to facilitate the purchasing.

In some embodiments of the present disclosure, a remaining amount of the cosmetic may be managed in accordance with the usage amount of the cosmetic during the makeup procedure. For example, when the makeup scheme A in Table 2 has been recommended to the user, a remaining amount of each cosmetic may be updated in accordance with the usage amount of the cosmetic in the makeup scheme in Table 2, so as to acquire the remaining amount of each cosmetic in time. When one or more cosmetics are to be used up, the user may be prompted to purchase new cosmetics, so it is able to improve the user's satisfaction.

In some embodiments of the present disclosure, when the user is purchasing a new cosmetic, the user may input information about the to-be-purchased cosmetic, and the information may be transmitted via the client device to the cloud device. The cloud device may search for the cosmetic using a user's account, and acquire information about the price of the cosmetic on one or more e-commerce platforms.

In some embodiments of the present disclosure, the cloud device may transmit the information about the price of the cosmetic to the client device. The client device may then output the following information: whether the to-be-purchased cosmetic has been purchased and is being used, whether the to-be-purchased cosmetic was purchased previously, any other cosmetic capable of being used in combination with the to-be-purchased cosmetic, and the price of the to-be-purchased cosmetic on the e-commerce platforms, so as to improve the user's satisfaction.

After the purchased cosmetic has been used up, the cosmetic may be deleted through the client device. Based on a cancellation operation made by the user, the information about the cosmetic that has been used up may be deleted from the information stored in the client device.

Figure 4:
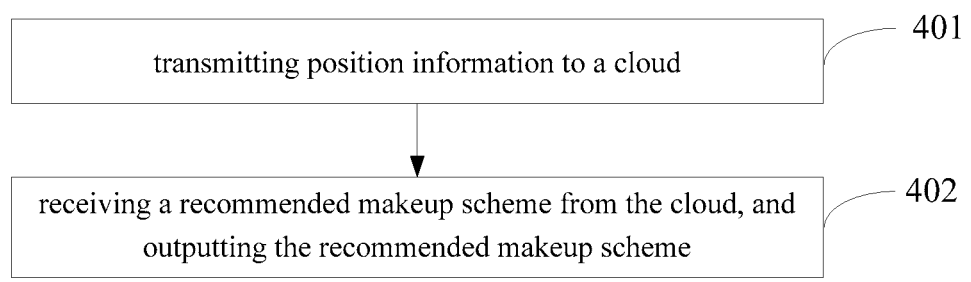
FIG. 4 is a flow chart of a makeup scheme recommendation method according to some embodiments of the present disclosure.

The present disclosure further provides in some embodiments a makeup scheme recommendation method which, as shown in FIG. 4, includes: Step 401 of transmitting position information to a cloud, so as to enable the cloud to acquire makeup parameters of a user, search for a target makeup scheme matching the makeup parameters from a makeup scheme pool, optimize the target makeup scheme in accordance with cosmetic information about the user, and generate a recommended makeup scheme, the makeup parameters including at least one of an environment parameter corresponding to the position information, a body parameter, and a makeup time parameter, the cosmetic information being used to indicate cosmetics owned by the user; and Step 402 of receiving the recommended makeup scheme from the cloud, and outputting the recommended makeup scheme.

In some embodiments of the present disclosure, the makeup scheme recommendation method may further include, prior to receiving the recommended makeup scheme from the cloud, transmitting the cosmetic information to the cloud. The cosmetic information may include at least one of a cosmetic type, a cosmetic name, a cosmetic purchasing date, a cosmetic price, a cosmetic manufacturer, a cosmetic production date, a cosmetic expiration date, and a cosmetic volume.

In some embodiments of the present disclosure, the makeup scheme recommendation method may further include, when the cosmetic information includes the cosmetic expiration date and the cosmetics owned by the user include a soon-to-expire cosmetic, receiving from the cloud a prompt message indicating that the cosmetic is about to expire, and outputting the prompt message.

In some embodiments of the present disclosure, the makeup scheme recommendation method may be applied to a client device, and the client device may be an electronic device installed on a mobile phone, a flat-panel computer, a computer or a television and connected to an electronic device of the cloud.

Figure 5:
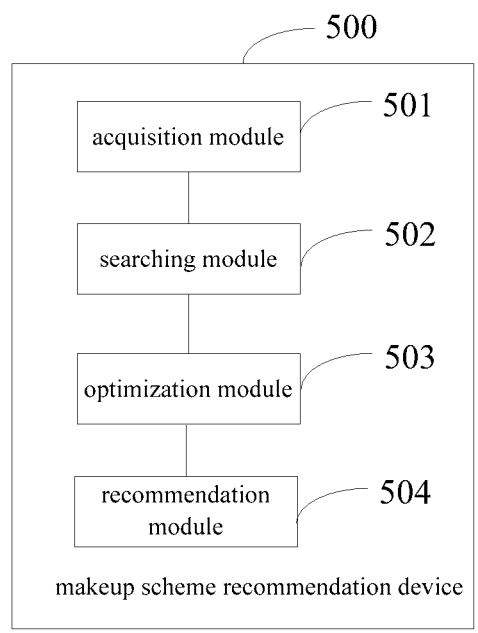
FIG. 5 is a schematic view showing a makeup scheme recommendation device according to some embodiments of the present disclosure.

The present disclosure further provides a makeup scheme recommendation device 500 which, as shown in FIG. 5, includes an acquisition module 501, a searching module 502, an optimization module 503 and a recommendation module 504. The acquisition module 501 is configured to acquire makeup parameters of a user, and the makeup parameters may include at least one of an environment parameter, a body parameter, and a makeup time parameter. The searching module 502 is configured to search for a target makeup scheme matching the makeup parameters from a makeup scheme pool. The optimization module 503 is configured to optimize the target makeup scheme in accordance with cosmetic information about the user, and generate a recommended makeup scheme, and the cosmetic information may be used to indicate cosmetics owned by the user. The recommendation module 504 is configured to provide the recommended makeup scheme to the user.

Figure 6:
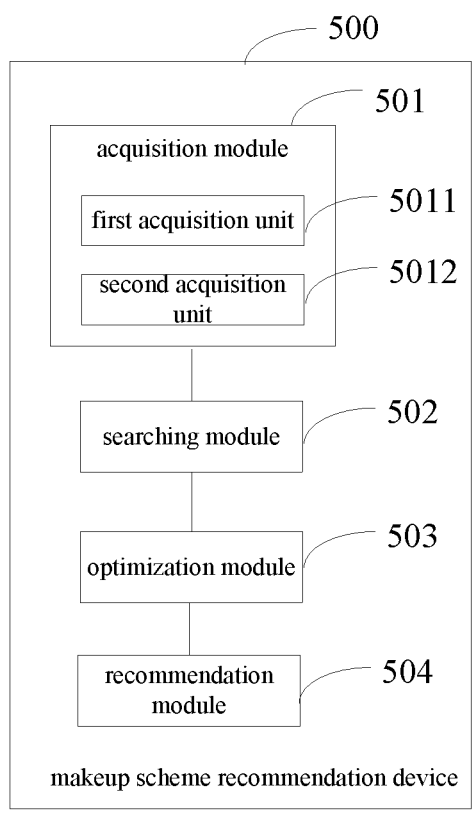
FIG. 6 is another schematic view showing the makeup scheme recommendation device according to some embodiments of the present disclosure.

In some embodiments of the present disclosure, as shown in FIG. 6, the acquisition module 501 may include: a first acquisition unit 5011 configured to acquire position information from a client device, and search for the environment parameter corresponding to the position information; and a second acquisition unit 5012 configured to acquire at least one of the pre-stored body parameter and the pre-stored makeup time parameter of the user.

In some embodiments of the present disclosure, the recommendation module 504 is further configured to provide the recommended makeup scheme to the client device.

In some embodiments of the present disclosure, each makeup scheme in the makeup scheme pool may be provided with a parameter group, and the searching module is further configured to rank matching scores between the parameter groups and the makeup parameters in a descending order, and search for N target makeup schemes corresponding to N top matching scores from the makeup scheme pool, where N is an integer greater than or equal to 1.

In some embodiments of the present disclosure, when N is an integer greater than 1, the optimization module 503 is further configured to select a target makeup scheme that best matches the cosmetics owned by the user from the N target makeup schemes, optimize the selected target makeup scheme in accordance with the cosmetic information about the user, and generate the recommended makeup scheme.

In some embodiments of the present disclosure, the optimization module 503 is further configured to add information about a cosmetic j in a step i of the target makeup scheme, and generate the recommended makeup scheme. The target makeup scheme may include M steps, where M is an integer greater than 1, and step i may be one of the M steps. The cosmetic j may be one of the cosmetics owned by the user and used in the step i, and the information about the cosmetic j may include at least one of a name and usage amount information of the cosmetic j.

Figure 7:
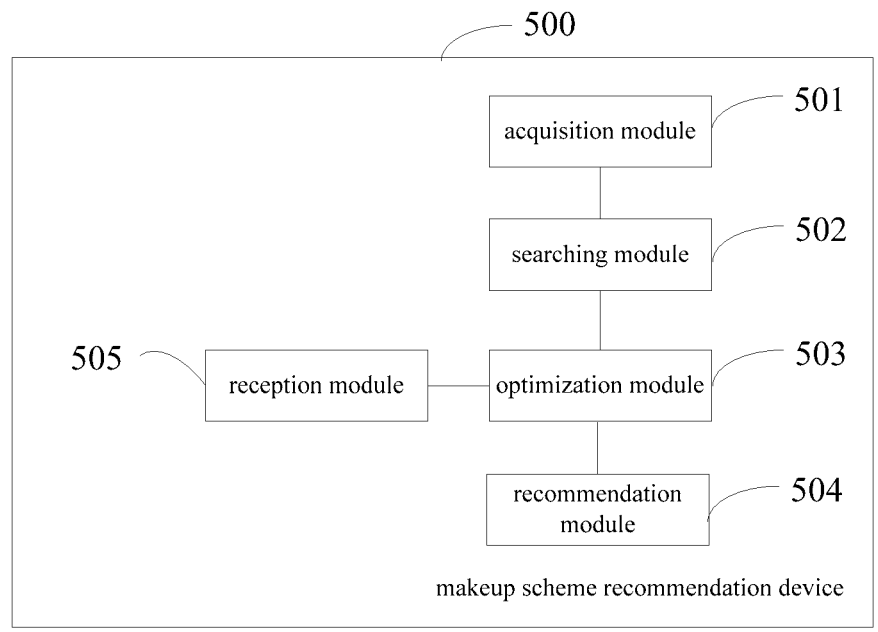
FIG. 7 is yet another schematic view showing the makeup scheme recommendation device according to some embodiments of the present disclosure.

In some embodiments of the present disclosure, as shown in FIG. 7, the makeup scheme recommendation device 500 may further include a reception module 505 configured to receive the cosmetic information from the client device. The cosmetic information may include at least one of a cosmetic type, a cosmetic name, a cosmetic purchasing date, a cosmetic price, a cosmetic manufacturer, a cosmetic production date, a cosmetic expiration date, and a cosmetic volume.

Figure 8:
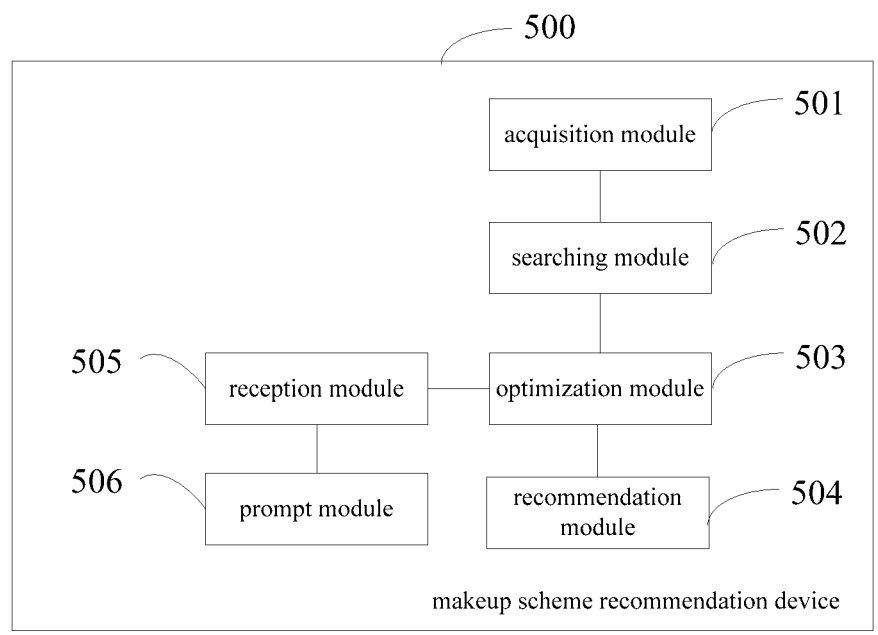
FIG. 8 is still yet another schematic view showing the makeup scheme recommendation device according to some embodiments of the present disclosure.

In some embodiments of the present disclosure, as shown in FIG. 8, the makeup scheme recommendation device may further includes a prompt module 506 configured to, when the cosmetic information includes the cosmetic expiration date and the cosmetics owned by the user include a soon-to-expire cosmetic, transmit a prompt message indicating that the cosmetic is about to expire to the client device.

In the embodiments of the present disclosure, the makeup scheme recommendation device 500 may be used to implement the makeup scheme recommendation method in FIG. 1 and FIG. 2 with a same beneficial effect.

Figure 9:
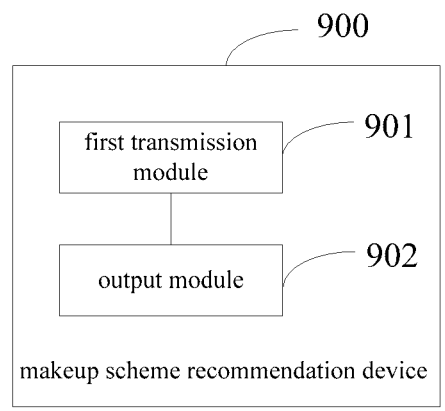
FIG. 9 is a schematic view showing a makeup scheme recommendation device according to some embodiments of the present disclosure.

The present disclosure further provides in some embodiments a makeup scheme recommendation device 900 which, as shown in FIG. 9, includes a first transmission module 901 and an output module 902. The first transmission module 901 is configured to transmit position information to a cloud, so as to enable the cloud to acquire makeup parameters of a user, search for a target makeup scheme matching the makeup parameters from a makeup scheme pool, optimize the target makeup scheme in accordance with cosmetic information about the user, and generate a recommended makeup scheme. The makeup parameters may include at least one of an environment parameter corresponding to the position information, a body parameter, and a makeup time parameter, and the cosmetic information may be used to indicate cosmetics owned by the user. The output module 902 is configured to receive the recommended makeup scheme from the cloud, and output the recommended makeup scheme.

Figure 10:
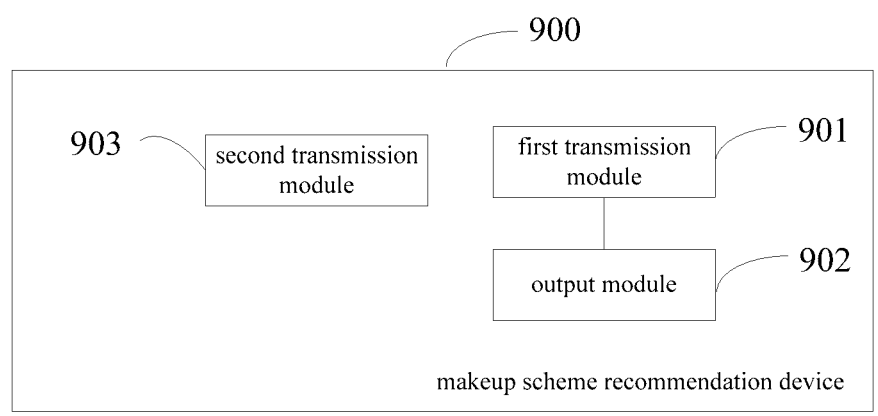
FIG. 10 is another schematic view showing makeup scheme recommendation device according to some embodiments of the present disclosure.

In some embodiments of the present disclosure, as shown in FIG. 10, the makeup scheme recommendation device 900 may further include a second transmission module 903 configured to transmit the cosmetic information to the cloud. The cosmetic information may include at least one of a cosmetic type, a cosmetic name, a cosmetic purchasing date, a cosmetic price, a cosmetic manufacturer, a cosmetic production date, a cosmetic expiration date, and a cosmetic volume.

Figure 11:
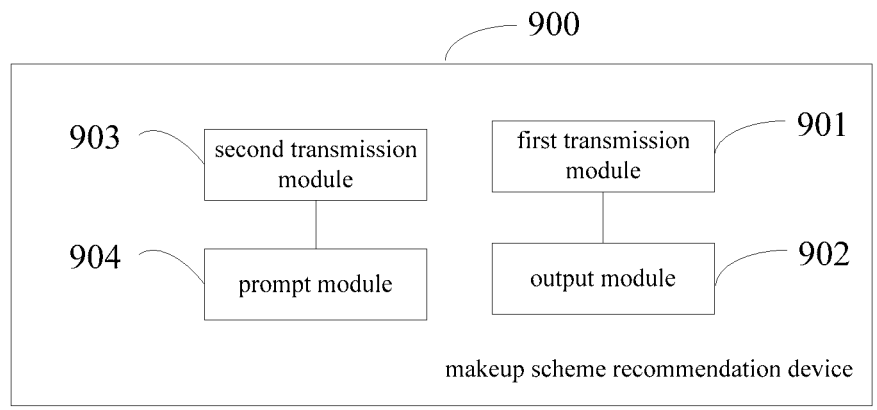
FIG. 11 is yet another schematic view showing the makeup scheme recommendation device according to some embodiments of the present disclosure.

In some embodiments of the present disclosure, as shown in FIG. 11, the makeup scheme recommendation device may further include a prompt module 904 configured to, when the cosmetic information includes the cosmetic expiration date and the cosmetics owned by the user include a soon-to-expire cosmetic, receive from the cloud a prompt message indicating that the cosmetic is about to expire, and output the prompt message.

In the embodiments of the present disclosure, the makeup scheme recommendation device 900 may be used to implement the makeup scheme recommendation method in FIG. 4 with a same beneficial effect.

Figure 12:
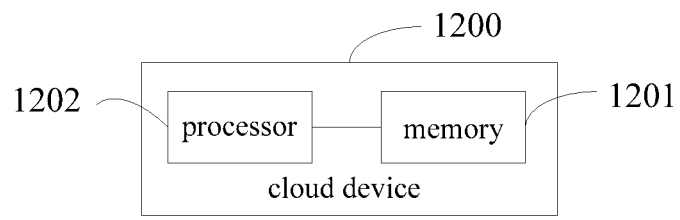
FIG. 12 is a schematic view showing a cloud device according to some embodiments of the present disclosure.

The present disclosure further provides in some embodiments a cloud device 1200 which, as shown in FIG. 12, includes a memory 1201, a processor 1202, and a computer program stored in the memory 1201 and executed by the processor 1202. The processor 1202 is configured to read the computer program stored in the memory 1201, so as to: acquire makeup parameters of a user, the makeup parameters including at least one of an environment parameter, a body parameter, and a makeup time parameter; search for a target makeup scheme matching the makeup parameters from a makeup scheme pool; optimize the target makeup scheme in accordance with cosmetic information about the user, and generate a recommended makeup scheme, the cosmetic information being used to indicate cosmetics owned by the user; and provide the recommended makeup scheme to the user.

In some embodiments of the present disclosure, the processor 1202 is further configured to perform at least one of: acquiring position information from a client device, and searching for the environment parameter corresponding to the position information; and acquiring at least one of the pre-stored body parameter and the pre-stored makeup time parameter of the user.

In some embodiments of the present disclosure, the processor 1202 is further configured to provide the recommended makeup scheme to the client device.

In some embodiments of the present disclosure, group, and the processor 1202 is further configured to rank matching scores between the parameter groups and the makeup parameters in a descending order, and search for N target makeup schemes corresponding to N top matching scores from the makeup scheme pool, where N is an integer greater than or equal to 1.

In some embodiments of the present disclosure, when N is an integer greater than 1, the processor 1202 is further configured to select a target makeup scheme that best matches the cosmetics owned by the user from the N target makeup schemes, optimize the selected target makeup scheme in accordance with the cosmetic information about the user, and generate the recommended makeup scheme.

In some embodiments of the present disclosure, the processor 1202 is further configured to add information about a cosmetic j in a step i of the target makeup scheme, and generate the recommended makeup scheme. The target makeup scheme may include M steps, M is an integer greater than 1, and step i may be one of the M steps. The cosmetic j may be one of the cosmetics owned by the user and used in the step i, and the information about the cosmetic j may include at least one of a name and usage amount information of the cosmetic j.

In some embodiments of the present disclosure, prior to optimizing the target makeup scheme in accordance with the cosmetic information about the user and generating the recommended makeup scheme, receive the cosmetic information from the client device. The cosmetic information may include at least one of a cosmetic type, a cosmetic name, a cosmetic purchasing date, a cosmetic price, a cosmetic manufacturer, a cosmetic production date, a cosmetic expiration date, and a cosmetic volume.

In some embodiments of the present disclosure, the processor 1202 is further configured to, when the cosmetic information includes the cosmetic expiration date and the cosmetics owned by the user include a soon-to-expire cosmetic, transmit a prompt message indicating that the cosmetic is about to expire to the client device.

In the embodiments of the present disclosure, the cloud device 1200 may be used to implement the makeup scheme recommendation method in FIGS. 1 and 2 with a same beneficial effect.

Figure 13:
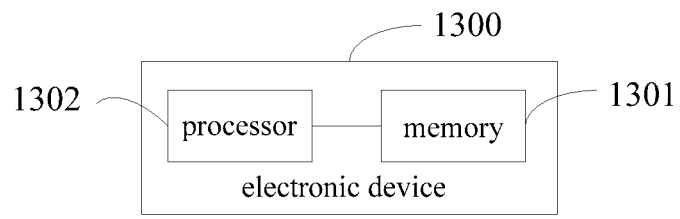
FIG. 13 is a schematic view showing an electronic device according to some embodiments of the present disclosure.

The present disclosure further provides in some embodiments an electronic device 1300 which, as shown in FIG. 13, includes a memory 1301, a processor 1302, and a computer program stored in the memory 1301 and executed by the processor 1302. The processor 1302 is configured to read the computer program stored in the memory 1301, so as to: transmit position information to a cloud, so as to enable the cloud to acquire makeup parameters of a user, search for a target makeup scheme matching the makeup parameters from a makeup scheme pool, optimize the target makeup scheme in accordance with cosmetic information about the user, and generate a recommended makeup scheme, the makeup parameters including at least one of an environment parameter corresponding to the position information, a body parameter, and a makeup time parameter, the cosmetic information being used to indicate cosmetics owned by the user; and receive the recommended makeup scheme from the cloud, and output the recommended makeup scheme.

In some embodiments of the present disclosure, prior to receiving the recommended makeup scheme from the cloud, the processor 1302 is further configured to transmit the cosmetic information to the cloud. The cosmetic information may include at least one of a cosmetic type, a cosmetic name, a cosmetic purchasing date, a cosmetic price, a cosmetic manufacturer, a cosmetic production date, a cosmetic expiration date, and a cosmetic volume.

In some embodiments of the present disclosure, the processor 1302 is further configured to, when the cosmetic information includes the cosmetic expiration date and the cosmetics owned by the user include a soon-to-expire cosmetic, receive from the cloud a prompt message indicating that the cosmetic is about to expire, and output the prompt message.

In the embodiments of the present disclosure, the electronic device 1300 may be used to implement the makeup scheme recommendation method in FIG. 4 with a same beneficial effect.

The present disclosure further provides in some embodiments a computer-readable storage medium storing therein a computer program. The computer program is executed by a processor so as to implement the makeup scheme recommendation method in FIG. 1 and FIG. 2, or the makeup scheme recommendation method in FIG. 4.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A makeup scheme recommendation method, comprising:
    acquiring makeup parameters of a user, the makeup parameters comprising at least one of an environment parameter, a body parameter, and a makeup time parameter;
    searching for a target makeup scheme matching the makeup parameters from a makeup scheme pool;
    optimizing the target makeup scheme in accordance with cosmetic information about the user, and generating a recommended makeup scheme, the cosmetic information being used to indicate cosmetics owned by the user; and
    providing the recommended makeup scheme to the user, wherein each makeup scheme in the makeup scheme pool is provided with a parameter group, and the searching for the target makeup scheme matching the makeup parameters from the makeup scheme pool comprises ranking matching scores between the parameter groups and the makeup parameters in a descending order, and searching for N target makeup schemes corresponding to N top matching scores from the makeup scheme pool, where N is an integer greater than or equal to 1, and
    wherein when N is an integer greater than 1, the optimizing the target makeup schemes in accordance with the cosmetic information about the user and generating the recommended makeup scheme comprises selecting a target makeup scheme that best matches the cosmetics owned by the user from the N target makeup schemes, optimizing the selected target makeup scheme in accordance with the cosmetic information about the user, and generating the recommended makeup scheme.

2. The makeup scheme recommendation method according to claim 1, wherein the acquiring the makeup parameters of the user comprises at least one of:
    acquiring position information from a client device of the user, and searching for the environment parameter corresponding to the position information; and
    acquiring at least one of the body parameter and the makeup time parameter of the user, wherein the body parameter and the makeup time parameter are stored in advance.

3. The makeup scheme recommendation method according to claim 2, wherein the providing the recommended makeup scheme to the user comprises providing the recommended makeup scheme to the client device.

4. The makeup scheme recommendation method according to claim 1, wherein the optimizing the target makeup schemes in accordance with the cosmetic information about the user and generating the recommended makeup scheme comprises adding information about a cosmetic j in a step i of the target makeup scheme, and generating the recommended makeup scheme, wherein the target makeup scheme comprises M steps, where M is an integer greater than 1, and step i is one of the M steps, and wherein the cosmetic j is one of the cosmetics owned by the user and used in the step i, and the information about the cosmetic j comprises at least one of a name and usage amount information of the cosmetic j.

5. The makeup scheme recommendation method according to claim 1, further comprising:
    prior to optimizing the target makeup scheme in accordance with the cosmetic information about the user and generating the recommended makeup scheme, receiving the cosmetic information from a client device, wherein the cosmetic information comprises at least one of a cosmetic type, a cosmetic name, a cosmetic purchasing date, a cosmetic price, a cosmetic manufacturer, a cosmetic production date, a cosmetic expiration date, and a cosmetic volume.

6. The makeup scheme recommendation method according to claim 5, further comprising:
    when the cosmetic information comprises the cosmetic expiration date and the cosmetics owned by the user comprise a soon-to-expire cosmetic, transmitting a prompt message indicating that the cosmetic is about to expire to the client device.

7. The makeup scheme recommendation method according to claim 1, further comprising:
    transmitting, by a client device, position information to the cloud, so as to enable the cloud to acquire makeup parameters of a user, search for a target makeup scheme matching the makeup parameters from a makeup scheme pool, optimize the target makeup scheme in accordance with cosmetic information about the user, and generate a recommended makeup scheme, the makeup parameters comprising at least one of an environment parameter corresponding to the position information, a body parameter, and a makeup time parameter, the cosmetic information being used to indicate cosmetics owned by the user; and receiving the recommended makeup scheme from the cloud, and outputting the recommended makeup scheme.

8. The makeup scheme recommendation method according to claim 7, further comprising:

prior to receiving the recommended makeup scheme from the cloud, transmitting, by the client device, the cosmetic information to the cloud, wherein the cosmetic information comprises at least one of a cosmetic type, a cosmetic name, a cosmetic purchasing date, a cosmetic price, a cosmetic manufacturer, a cosmetic production date, a cosmetic expiration date, and a cosmetic volume.

9. The makeup scheme recommendation method according to claim 8, further comprising:

when the cosmetic information comprises the cosmetic expiration date and the cosmetics owned by the user comprise a soon-to-expire cosmetic, receiving from the cloud a prompt message indicating that the cosmetic is about to expire, and outputting the prompt message.

10. A cloud device, comprising a memory, a processor, and a computer program stored in the memory and executed by the processor, wherein the processor is configured to execute the computer program so as to implement a makeup scheme recommendation method, comprising:

acquiring makeup parameters of a user, the makeup parameters comprising at least one of an environment parameter, a body parameter, and a makeup time parameter;

searching for a target makeup scheme matching the makeup parameters from a makeup scheme pool;

optimizing the target makeup scheme in accordance with cosmetic information about the user, and generating a recommended makeup scheme, the cosmetic information being used to indicate cosmetics owned by the user; and providing the recommended makeup scheme to the user, wherein each makeup scheme in the makeup scheme pool is provided with a parameter group, and the searching for the target makeup scheme matching the makeup parameters from the makeup scheme pool comprises ranking matching scores between the parameter groups and the makeup parameters in a descending order, and searching for N target makeup schemes corresponding to N top matching scores from the makeup scheme pool, where N is an integer greater than or equal to 1, and wherein when N is an integer greater than 1, the optimizing the target makeup schemes in accordance with the cosmetic information about the user and generating the recommended makeup scheme comprises selecting a target makeup scheme that best matches the cosmetics owned by the user from the N target makeup schemes, optimizing the selected target makeup scheme in accordance with the cosmetic information about the user, and generating the recommended makeup scheme.

11. The cloud device according to claim 10, wherein the acquiring the makeup parameters of the user comprises at least one of:

acquiring position information from a client device of the user, and searching for the environment parameter corresponding to the position information; and acquiring at least one of the body parameter and the makeup time parameter of the user, wherein the body parameter and the makeup time parameter are stored in advance.

12. The cloud device according to claim 11, wherein the providing the recommended makeup scheme to the user comprises providing the recommended makeup scheme to the client device.

13. The cloud device according to claim 10, wherein the optimizing the target makeup schemes in accordance with the cosmetic information about the user and generating the recommended makeup scheme comprises adding information about a cosmetic j in a step i of the target makeup scheme, and generating the recommended makeup scheme, wherein the target makeup scheme comprises M steps, where M is an integer greater than 1, and step i is one of the M steps, and wherein the cosmetic j is one of the cosmetics owned by the user and used in the step i, and the information about the cosmetic j comprises at least one of a name and usage amount information of the cosmetic j.

14. The cloud device according to claim 10, wherein the processor is further configured to:

prior to optimizing the target makeup scheme in accordance with the cosmetic information about the user and generating the recommended makeup scheme, receive the cosmetic information from a client device, wherein the cosmetic information comprises at least one of a cosmetic type, a cosmetic name, a cosmetic purchasing date, a cosmetic price, a cosmetic manufacturer, a cosmetic production date, a cosmetic expiration date, and a cosmetic volume.

15. The cloud device according to claim 14, wherein the processor is further configured to:

when the cosmetic information comprises the cosmetic expiration date and the cosmetics owned by the user comprise a soon-to-expire cosmetic, transmit a prompt message indicating that the cosmetic is about to expire to the client device.

16. A system, comprising a cloud device and a client device, wherein the cloud device comprises a memory, a processor, and a computer program stored in the memory and executed by the processor, wherein the processor is configured to execute the computer program so as to implement a makeup scheme recommendation method, comprising:

acquiring makeup parameters of a user, the makeup parameters comprising at least one of an environment parameter, a body parameter, and a makeup time parameter;

searching for a target makeup scheme matching the makeup parameters from a makeup scheme pool;

optimizing the target makeup scheme in accordance with cosmetic information about the user, and generating a recommended makeup scheme, the cosmetic information being used to indicate cosmetics owned by the user; and providing the recommended makeup scheme to the user, wherein each makeup scheme in the makeup scheme pool is provided with a parameter group, and the searching for the target makeup scheme matching the makeup parameters from the makeup scheme pool comprises ranking matching scores between the parameter groups and the makeup parameters in a descending order, and searching for N target makeup schemes corresponding to N top matching scores from the makeup scheme pool, where N is an integer greater than or equal to 1,
wherein when N is an integer greater than 1, the optimizing the target makeup schemes in accordance with the cosmetic information about the user and generating the recommended makeup scheme comprises selecting a target makeup scheme that best matches the cosmetics owned by the user from the N target makeup schemes, optimizing the selected target makeup scheme in accordance with the cosmetic information about the user, and generating the recommended makeup scheme, and
wherein the client device comprises a memory, a processor, and a computer program stored in the memory and executed by the processor, wherein the processor is configured to execute the computer program so as to implement:
transmitting position information to the cloud device, so as to enable the cloud device to acquire makeup parameters of a user, search for a target makeup scheme matching the makeup parameters from a makeup scheme pool, optimize the target makeup scheme in accordance with cosmetic information about the user, and generate a recommended makeup scheme, the makeup parameters comprising at least one of an environment parameter corresponding to the position information, a body parameter, and a makeup time parameter, the cosmetic information being used to indicate cosmetics owned by the user; and
receiving the recommended makeup scheme from the cloud device, and outputting the recommended makeup scheme.

* * * * *